Patented Sept. 30, 1924.

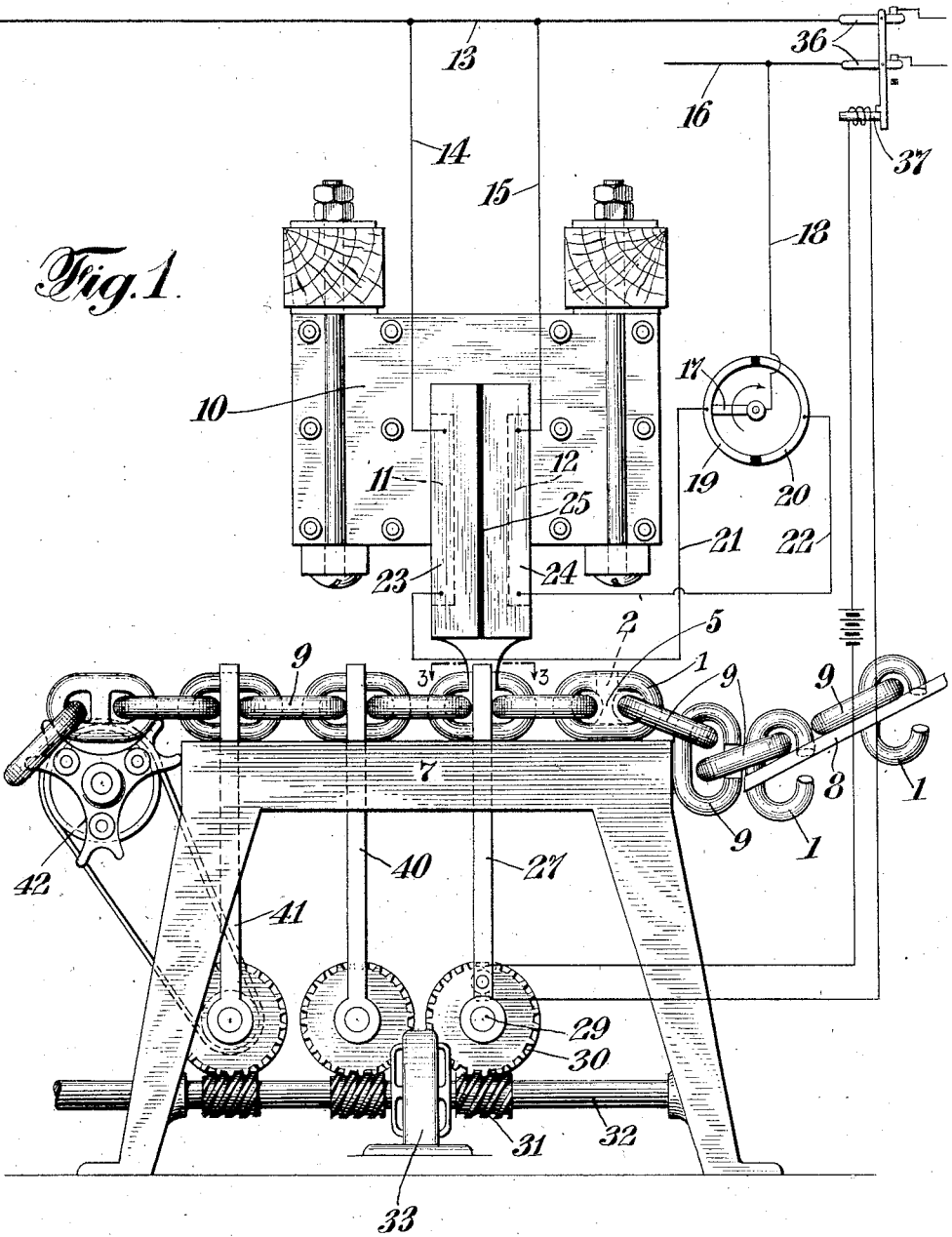

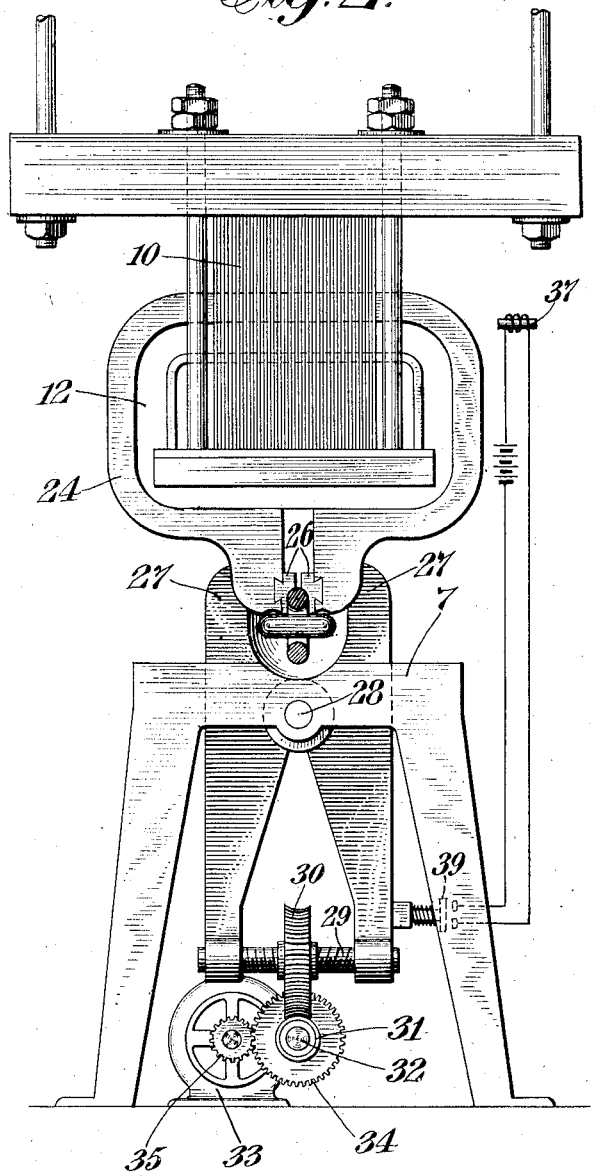
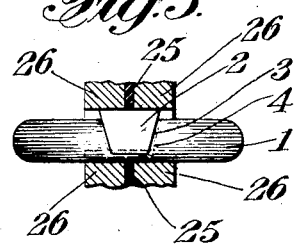
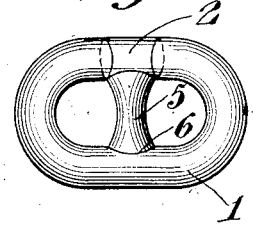
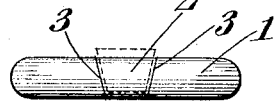

1,510,197

UNITED STATES PATENT OFFICE.

MICHAEL B. RYAN, OF MILFORD, CONNECTICUT.

METHOD OF AND MACHINE FOR ELECTRIC WELDING.

Application filed August 8, 1923. Serial No. 656,405.

*To all whom it may concern:*

Be it known that I, MICHAEL B. RYAN, a citizen of the United States, a resident of Milford, in the county of New Haven and State of Connecticut, have invented a certain new and useful Improvement in Methods of and Machines for Electric Welding, of which the following is a specification.

The invention relates to the art of welding chain links or similar articles, particularly links which have been constructed with a gap to permit the same to be hooked up to other links prior to the welding operation and in which the gap is closed by inserting therein a plug which is welded in position.

Although not limited to such use, the invention is particularly advantageous for use in welding heavy chain links up to 3" or greater diameter, one of the important objects of the invention being to provide a method and machine whereby links of large diameter may be rapidly and reliably welded.

Further objects and advantages of the invention will be in part obvious and in part specifically pointed out in the description hereinafter contained, which, taken in connection with the accompanying drawings discloses a machine capable of operating in accordance with the invention; such disclosure, however, is to be considered as merely illustrative of the principles of the invention.

In the drawings—

Figure 1 is a front view of a welding machine constructed in accordance with the invention;

Figure 2 is an end view of the machine shown in Figure 1;

Figure 3 is a detail sectional view taken on line 3—3 of Figure 1, and

Figures 4 and 5 are respectively a plan and side view of a chain link adapted to be welded in accordance with the invention.

The invention is illustrated as applied to the welding of a chain link 1 which may be formed in any desired manner, having a gap therein which will usually be large enough to permit the link to be engaged with other closed links. A plug or filler-member 2 which is somewhat larger than the gap above mentioned, is placed therein after the links have been hooked up as aforesaid, and welded in position. In the present embodiment of the invention the plug member 2 is provided with tapered or wedge-shaped sides 3 adapted to engage against similarly shaped surfaces 4 at the adjacent ends of the links 1, and where the invention is applied to links of the stud type the plug member 2 may be made integral with a stud 5 having a base 6 engaging or welded to the corresponding side of the link.

The operation of welding links of the above nature involves the making of two distinct welds and in accordance with the present invention this welding operation is carried out in such a manner that the welding current is selectively applied to the joints between the plug and link; thus the current is alternately switched back and forth from one point to the other until the entire welding operation is complete.

The illustrated machine is provided with a suitable table 7 upon which the links to be welded are placed; in the present instance the links are fed from right to left as the machine appears in Figure 1, the links of the type previously described in connection with Figures 4 and 5 being fed from a slotted guide 8 and alternated with fully closed links 9. As the links come on to the table 7 the plugs 2 are inserted in the gaps of links 1 thus placing the chain in condition for the welding operation.

The welding operation is carried out by means of a transformer having a suitable core 10, cooperating primary and secondary windings which are made in the form of separate sections insulated from each other in such manner that either secondary section may be energized independently of the other and a switch is provided for shifting the current from one secondary to the other when desired. As shown, primary sections 11 and 12 are connected to one of the line conductors 13 through leads 14 and 15 respectively, and the opposite terminals of such sections are connected to another line conductor 16 through a switch in such manner that the sections may be selectively energized. The particular switch employed for the above purpose is not essential, the illustrated form of switch embodying a rotary contact arm 17 connected to the line conductor 16 through a wire 18, and arcuate contacts 19 and 20 which are connected respectively to primary sections 11 and 12 through wires 21 and 22. The switch arm 17 may thus be rotated in close circuit to either of the primary sections 11 and 12, as desired.

Secondary sections 23 and 24 are associated respectively with the primary sections 11 and 12, the secondaries being adequately insulated from each other as by insulating sheets 25 and each secondary is provided with a pair of electrodes 26 shaped to fit against the links at the points to be welded.

Pressure is applied to the electrodes 26 during the welding operation by means of jaws 27 which are forced together in any suitable manner; as shown these jaws are pivoted above a spindle 28 (Figure 2) and the bottom ends of the jaws are forced apart by means of a shaft 29 having opposed threads engaging the same and driven by a worm gear 30 which meshes with a worm 31 on a shaft 32, the latter being coupled to a motor 33 through gears 34 and 35 (Figure 2). A reversing clutch (not illustrated) will usually be employed for reversing the direction of rotation of the shaft 32 when the jaws 27 have reached the limits of their movement but since such a clutch mechanism is well known it is not considered necessary to describe the same in detail herein.

The electrodes 26 engage the link to be welded in the manner shown in Figure 3, that is to say, each pair of electrodes leads the current only to one of the joints between the plug 2 and the ends of the link; thus when the lefthand pair of electrodes, for example, are energized the current will flow through the lefthand joint and the righthand joint will receive heat only by conduction. After a given interval of time the switch arm 17 shifts the circuit connections in such manner that the righthand pair of electrodes 26 are energized to weld the righthand joint between the plug and link.

In welding according to the above method, it will be noted that a proper amount of current is assured for each joint to be welded, whereas if it were attempted to weld both joints in one operation, it would be a very difficult matter to obtain an equal flow of current through the two joints. Furthermore, in welding rods of large size the heat applied to the metal is liable to melt the parts which are most intensely heated before the remaining parts of the joints have been properly welded; in accordance with the present invention the heat is applied intermittently, tending to avoid the above difficulty. Nevertheless, the current is used substantially continuously for one joint or the other and each joint will receive a certain amount of heat by conduction when the current is being applied to the other joint.

I prefer to construct the machine so that when the plug has been fully seated in proper position, the current will be automatically cut off; this is accomplished in the present instance by providing a circuit breaker 36 in the line circuit, which is normally held closed by an electromagnetically acuated latch 37; but when one of the jaws 27 has completed its pressure stroke said jaw engages a circuit closer 39 completing circuit to the latch 37 and causing the same to be withdrawn to permit the circuit breaker 36 to fall to open position.

In the present embodiment of the invention further jaws 40 and 41 are illustrated (Figure 1) said jaws being similar in construction and mode of operation to the jaws 27 previously described. The jaws 40 may act, for example, to shape the welded portion of the link after the welding operation, and jaws 41 may be used to trim off a fin such as will usually be formed during the shaping operation. The machine may also be provided with a suitable sprocket wheel 42, intermittently actuated at suitable intervals to feed the joint along through the machine: the details of such feeding mechanism, however, it is not considered necessary to describe.

While a specific embodiment of the invention has been disclosed it will be obvious that many changes may be made therein without departing from its principles as defined in the appended claims.

I claim:

1. The method of electrically welding a chain link having a gap therein which comprises inserting a plug in the gap and applying welding current first to one of the joints between the plug and the link and then to the other of said joints.

2. The method of electrically welding a chain link having a gap therein which comprises inserting a plug in the gap and selectively applying the welding current to the joints between the plug and link.

3. A chain welding machine having adjacent secondary sections insulated from each other and means for selectively energizing said secondary sections.

4. A chain welding machine having adjacent secondary sections insulated from each other and means for automatically switching the welding current from one section to the other.

5. A chain welding machine having adjacent secondary sections insulated from each other, means for selectively energizing said secondary sections and means for automatically breaking the circuit to the secondaries when the welding operation is completed.

6. A chain welding machine having adjacent secondary sections insulated from each other and having electrodes adapted to engage respectively adjacent joints to be welded, jaws for forcing together said electrodes and means for breaking circuit to the secondaries when said jaws have reached their inner-limit position.

In testimony that I claim the foregoing, I have hereunto set my hand this 26th day of July, 1923.

MICHAEL B. RYAN.